United States Patent
Goedee et al.

(10) Patent No.: US 10,325,186 B2
(45) Date of Patent: Jun. 18, 2019

(54) ANTI SKIMMING AND ANTI SHIMMING CARD FEED UNIT, KERNEL ELEMENT, READ OUT UNIT, TRANSACTION MACHINE AND METHOD

(71) Applicant: TMD HOLDING B.V., Blaricum (NL)

(72) Inventors: Cornelis Johannes Goedee, Utrecht (NL); Leonardus Antonius Maria Van Den Bogart, Utrecht (NL); Marina Helena De Jongh, Utrecht (NL)

(73) Assignee: TMD Holding B.V., Blaricum (NL)

( * ) Notice: Subject to any disclaimer, the term of this patent is extended or adjusted under 35 U.S.C. 154(b) by 0 days.

(21) Appl. No.: 15/726,106

(22) Filed: Oct. 5, 2017

(65) Prior Publication Data

US 2018/0032847 A1    Feb. 1, 2018

Related U.S. Application Data

(63) Continuation of application No. 14/893,406, filed as application No. PCT/NL2012/050872 on Dec. 10, 2012, now Pat. No. 9,818,049.

(30) Foreign Application Priority Data

| Dec. 8, 2011 | (NL) | 1039226 |
|---|---|---|
| Mar. 27, 2012 | (NL) | 2008553 |
| Oct. 16, 2012 | (NL) | 2009644 |

(51) Int. Cl.
G06K 7/08 (2006.01)
G06K 13/08 (2006.01)

(52) U.S. Cl.
CPC ......... *G06K 13/0887* (2013.01); *G06K 7/087* (2013.01); *G06K 13/08* (2013.01); *G06K 13/0868* (2013.01)

(58) Field of Classification Search
CPC .................................................. G06K 13/0887
(Continued)

(56) References Cited

U.S. PATENT DOCUMENTS

| 4,587,571 A | 5/1986 | Anderson et al. |
|---|---|---|
| 4,847,475 A | 7/1989 | Watabe et al. |

(Continued)

FOREIGN PATENT DOCUMENTS

| EP | 0085497 A1 | 8/1983 |
|---|---|---|
| WO | 2010110659 A1 | 9/2010 |
| WO | WO2012151654 | * 5/2011 |

OTHER PUBLICATIONS

"Cineo C2060—Multifunction automated teller machine for indoor installations", 2011, Wincor Nixdorf International GmbH, Paderborn, Germany.

*Primary Examiner* — Allyson N Trail
(74) *Attorney, Agent, or Firm* — The Webb Law Firm (57) ABSTRACT

A card feed unit for transferring a data carrier for card information of a multi-services card, such as a bank card or credit card, to a reading ahead of a reading unit for at least reading out card information. The card feed unit includes a card receipt position for receipt of the card, a transfer assembly, preferably including a channel, in which the card feed unit is suitable for, during insertion of the card in the receipt position, receiving the card in the receipt position by means of an insertion operation with a direction of movement that, at least as seen in one direction, is substantially perpendicular to the readout direction of the card for preventing that the card is readable during the insertion operation. The card feed unit preferably includes a kernel element and a separate cover element.

19 Claims, 10 Drawing Sheets

(58) Field of Classification Search
USPC .................................. 235/449, 375, 379, 380
See application file for complete search history.

(56) References Cited

U.S. PATENT DOCUMENTS

| | | | |
|---|---|---|---|
| 8,240,566 B1* | 8/2012 | Criscitiello | G06K 7/0078 235/379 |
| 8,622,297 B1* | 1/2014 | Yokomoto | G07F 19/2055 109/8 |
| 2005/0145689 A1 | 7/2005 | Osawa et al. | |
| 2006/0054700 A1 | 3/2006 | May | |
| 2007/0057070 A1* | 3/2007 | Scarafile | G06K 7/084 235/475 |
| 2007/0131768 A1 | 6/2007 | Wakabayashi | |
| 2007/0158421 A1* | 7/2007 | Lin | H04N 1/0464 235/454 |
| 2008/0072423 A1* | 3/2008 | Finn | G06K 19/07327 29/854 |
| 2008/0265032 A1* | 10/2008 | Horiguchi | G06K 7/083 235/449 |
| 2010/0170703 A1* | 7/2010 | Iihola | H01L 24/18 174/254 |
| 2011/0177290 A1* | 7/2011 | Tomamoto | B32B 17/064 428/142 |
| 2011/0238581 A1* | 9/2011 | Severson | G06Q 20/04 705/67 |
| 2012/0080518 A1* | 4/2012 | Van Den Bogart | G06K 13/0843 235/379 |
| 2013/0087615 A1* | 4/2013 | Tudor | G06K 7/082 235/449 |
| 2013/0146662 A1 | 6/2013 | Randolph | |
| 2014/0232863 A1* | 8/2014 | Paliga | H04N 21/23109 348/143 |
| 2015/0091547 A1* | 4/2015 | Vasilev | G07F 19/2055 324/76.45 |
| 2018/0040206 A1* | 2/2018 | Wiesinger | G06K 7/083 |

* cited by examiner

ANTI SKIMMING AND ANTI SHIMMING CARD FEED UNIT, KERNEL ELEMENT, READ OUT UNIT, TRANSACTION MACHINE AND METHOD

CROSS REFERENCE TO RELATED APPLICATIONS

This application is a continuation of U.S. application Ser. No. 14/893,406, filed on Nov. 23, 2015, which is the United States national stage of International Application No. PCT/NL2012/050872, filed on Dec. 10, 2012, which claims priority to Netherlands Patent Application No. 1039226, filed on Dec. 8, 2011, Netherlands Patent Application No. 2008553, filed on Mar. 27, 2012, and Netherlands Patent Application No. 2009644, filed on Oct. 16, 2012. The disclosures of all of the above-mentioned applications are incorporated by reference herein in their entireties.

BACKGROUND OF THE INVENTION

Field of the Invention

The present invention relates to a card feed unit for transferring a data carrier for card information of a multi-services card, such as a bank card or credit card, to a reading head of a reading unit for at least reading out card information. Furthermore, the present invention relates to a kernel element. Furthermore, the present invention relates to a card reading unit for reading out of card data from a data carrier of a bank card, comprising a reading head and a card feed unit and/or a kernel element. Furthermore, the present invention relates to a transaction machine, such as a payment device or an automated teller machine (ATM), for performing transactions while using a payment card, comprising a read out unit for reading out of card information from a data carrier of a payment card and comprising a card feed unit and/or a kernel element. Furthermore, the present invention relates to a method for safely performing transactions while using a card feed unit and/or a kernel element according to the present invention.

Description of Related Art

The current applicant is also applicant of International Application No. PCT/NL2010/050147. In this patent application, a definition is disclosed of a card feed unit that allows for the prevention of skimming of bank cards and/or transactions performed with bank cards. Also, a specific reference is made to the definitions incorporated in this application. An express purpose of the reference to this application is to incorporate any embodying features from the earlier application in this text.

While the above patent application is directed to an invention allowing for a new type of security measure, the present application intends to further along the onset of the earlier development.

SUMMARY OF THE INVENTION

In order to provide announcements to the above prior art, the present invention provides a card feed unit for transferring a data carrier for card information of a multi-services card, such as a bank card or credit card, to a reading ahead of a reading unit for at least reading out card information, the card feed unit comprising:
 a card receipt position for receipt of the card,
 a transfer assembly, preferably comprising a channel, for transferring the card by means of the transfer assembly in the direction of the reading head, in which:

the card feed unit is suitable for, during insertion of the card in the receipt position, receiving the card in the receipt position by means of an insertion operation with a direction of movement that, at least as seen in one direction, is substantially perpendicular to the readout direction of the card for preventing the card from being readable during the insertion operation, the card feed unit in a preferred embodiment preferably comprising a kernel element for providing a structural firmness, in which the kernel element is provided with fastening means for a cover element for providing an external appearance to the card feed unit.

An advantage of such a preferred embodiment is that the exterior, both in the visual appearance and in the touch experience, may be provided independently of the production of the kernel element. This provides an advantage that the device may be produced in a relatively cost-effective manner. The present embodiment provides as one advantage that the kernel element may be produced by simple production processes as compared to the uni-body design from the prior art, such as by means of extrusion. Such methods of producing do not require expensive form-shaping processes or finishing processes. Examples of materials to be used for the kernel element and the cover element are made possible, such as aluminum, or other metal such as iron or steel, for the kernel element and a synthetic material or plastic for the cover element.

In a further preferred embodiment, the kernel element comprises at least one extrusion element, preferably two or more extrusion elements. An extrusion process provides for a cost-effective way to produce a kernel element while allowing for features according to this patent specification.

In a further preferred embodiment, in the card feed unit comprising a cover element, the cover element has an external appearance that is at least partially independently selectable with respect to the kernel element. An advantage thereof comprises that the external appearance of the cover element may be adapted to different circumstances of use, or even adapted to branding of, e.g., a bank environment or a railroad environment. The cover element may be shaped independent of the kernel element. It may have a shape as indicated in the prior application, or just have a basic shape following the shape of the kernel element. The shape may also be adapted to any design indications depending on the use environment.

Preferably, the cover element is once attachable to the kernel element by means of adhesion or curing or the cover element is removably attachable to the kernel element. A once-attachable cover element may also be regarded as a security feature, providing extra strength. Preferably, the cover element comprises as a main forming material an artificial material, such as a plastic, or a metal, or is formed therefrom, preferably by means of an injection molding process.

In a further preferred embodiment of the card feed unit, the kernel element comprises channels or openings for receiving at least one functionality provider, such as a security element, a grinding retardant, and electrical detection loop and/or a heating element. Such features provide advantages each in themselves and in combination. For example, the grinding retardant provides structural strength providing mechanical limitations as to tampering with the card feed unit. Also for example, an electrical detection loop provides for the option of providing a signal in case of tampering with the card feed unit. In combination, such measures, suitably arranged, allow for protection of the electrical detection loop, or for direction of tampering utensils toward the detection loop in order to have the detection loop expressly damaged when trying to tamper with the card feed unit. Example thereof is one an extremely hard material makes a drill bit to be urged toward the electrical detection loop.

Preferably, at least a channel of the kernel element is formed by means of extrusion. By means of such a process, such channel may be provided in the same production step as creating the kernel element itself, thereby eliminating the need for separate drilling steps in a metal kernel element.

Preferably, a reinforcement element for fortifying an end of the kernel element is provided, wherein the reinforcement element preferably comprises throughput openings for receiving at least a functionality provider, such as an electrical detection loop. An advantage of such an arrangement is that one single loop may be provided extending all through the kernel element, including through the reinforcing element and back to the kernel element. Such an arrangement allows for one loop to effectively secure the card feed unit along substantially its whole length.

In a further preferred embodiment, the card feed unit comprises an alarm-causing member, such as a separation member, such as a cutter or a punch, suitable for separation of a security element for activating an alarm condition. When, for example, the alarm-causing member is arranged for affecting an electrical detection loop, an underlying condition may be caused by tampering with the card feed unit and/or the kernel element thereof.

Preferably, the alarm-causing member is attached to at least a first attaching position in a fixing manner, preferably at the kernel element, and in which the alarm-causing member is attached at a second fastening position allowing for a movement relative to this second fastening position. Because of such relative movement, such arrangements would allow for cutting through the electrical detection loop, thereby allowing for a state of alarm, such as by breaking the loop for detection means to detect.

Preferably, movement is possible between the electrical detection loop and the alarm-causing member, preferably because the second fastening position is movably positioned relative to the detection loop. An example feature creating such a movable position is by means of the use of screws or bolts that are relatively small with respect to the openings into which they are fastened. This allows both for fastening by means of such screws but also for the relative movement. Preferably, the threading of such bolts or screws extends relatively far from the core part of such bolts or screws, preferably allowing for breakage of the threading upon manipulation of the kernel element.

In a further preferred embodiment, a channel wall separating the electrical detection loop from a card feed channel is such that manipulation of the card feed channel leads to an alarm condition by means of a reach of the electrical detection loop, either directly by the manipulation operation or by means of separating by means of the alarm-causing member. Furthermore, it is preferred that the alarm-causing member, such as the separating member, is arranged in such a way relative to the transfer assembly and/or the kernel that an alarm condition is initiated by manipulation of the transfer assembly and/or the kernel, leading to a physical displacement or disformation, leading to an alarm condition, of the transfer assembly and/or the kernel relative to the alarm-causing member, such as the separating member.

Furthermore, it is preferred that the alarm-causing member, such as the separating member, is fixed relative to the security element. An example thereof is that when trying to manipulate the card feed unit by means of a device like a screwdriver by inserting the screwdriver into the card feed channel, the alarm-causing member cuts through the electrical loop, thereby causing alarm. Another example is that one part of the core element, comprising the loop, is moved with respect to another part of the core element, leading to cutting through the electrical loop.

In an embodiment in which the security element is arranged in a channel with a flat side in which the same is arranged adjacent to its flat side, preferably urged by means of a grinding retardant and/or a glue, it is advantageous that the position of the security element, such as the loop, is specifically determined for high predictability of damaging the same during a manipulation operation of the card feed unit.

Preferably, the card feed unit comprises a functionality provider, such as a detection loop, that is embodied as a conductor on a substrate, preferably a flexible substrate in which the conductor is preferably arranged on the substrate in a zigzag manner, by further preference with tracks in the longitudinal direction, by further preference provided with at least one cross-connecting track. Such an arrangement of the loop allows for both a long-term reliable closed loop as well as a breach of the loop by minimal tampering effort. When tampering occurs, almost instant breach of the loop is attainable, which would indicate such tampering and provide a signal based on which the card reader can be disabled or switched off.

In order to provide further improvements to the kernel element, this same preferably comprises such functionality providers, such as a security element, a grinding retardant, and/or a heating element. A grinding retardant can provide extra strength as resistance against grinding through the kernel element. Also, the grinding retardant can help direct a grinder or a drill toward the loop for enhancing the chance of breach of the loop. This is specifically achieved when the hardness of the grinding retardant is relatively higher than the hardness of body of the kernel element, such as a ceramic material relative to aluminum.

In a further embodiment, the card feed unit comprises cover means for covering at least a top side or a bottom side of a wall of the card read unit adjacent to the channel. An advantage is that any manipulation is physically hampered by the presence of the cover means. The cover means are provided preferably with materials hampering, sawing, milling, grinding, etc., as indicated at other passages of this text referring to grinding resistance.

Preferably, in the card feed unit, the cover means extend into a hand insertion opening for insertion of a hand during a card read operation. Because of this feature, a card feed unit in which the reading head is located slightly recessed vis-à-vis the front plate can be protected effectively, as any space in front of the reading head is prevented from being made accessible for placing a contraband reading head.

Especially when the card feed unit is a manual unit, the above features are applicable to provide prevention of skimming opportunities.

A further preferred embodiment in which the cover means comprises a detection member, preferably an alarm-causing member, further preferably with an electrical circuit that upon breakage thereof indicates detection of the manipulation, further preferably comprising flexprints comprising conductive material. An advantage thereof is that also, electronic detection means are available to provide for alarm notifications to remote control facilities as well as to provide for signaling based on which the system on which the card feed unit is applied to shut down upon tampering with the electrical circuit.

Also, the aspect of providing the cover means for covering preferably at least a top side or a bottom side of a wall of the card read unit independently of the card feed unit comprising the card receipt position for receipt of the card, the transfer assembly, preferably comprising a channel. An advantage thereof is applicability of the cover means covering at least a part of the wall providing protection adjacent to the original read head independently of other features as indicated in this document.

A further aspect of the present invention relates to a kernel element or a cover element according to the invention for use in a card feed unit according to the invention. Many of the above advantages may be achieved by either of these elements in itself when applied.

A further aspect of the present invention relates to a card reading unit for reading out of card data from a data carrier of a bank card, comprising a reading head and a card feed unit and/or a kernel element according to the present invention. In light of the above, this card reading unit will achieve advantages as indicated.

A further aspect of the present invention relates to a transaction machine, such as a payment device or an automated teller machine (ATM), for performing of transactions while using a payment card, comprising a read out unit for reading out of card information from a data carrier of a payment card and comprising a card feed unit and/or a kernel element according to the present invention. In light of the above, this card reading unit will achieve advantages as indicated.

A further aspect of the present invention provides a method for safely performing transactions while using a card feed unit and/or a kernel element and/or machine according to the invention, the method comprising the steps of:
  providing of the card feed unit and/or a kernel element and a transaction machine,
  allowing a user to use the transaction machine,
  while using the card feed device by the user, performing a transaction. In light of the above, this card reading unit will achieve advantages as indicated.

BRIEF DESCRIPTION OF THE DRAWINGS

Further advantages, features, and details of the present invention will be described in greater detail with reference to the annexed drawings and based on one or more preferred embodiments. The drawings show as follows. Similar yet not necessarily identical parts of several preferred embodiments are referred to with the same reference numerals.

DETAILED DESCRIPTION OF THE INVENTION

A first preferred embodiment (FIGS. 1-6) according to the present invention relates to a kernel element 1. The kernel element is built up comprising two extrusion elements 2, 3 providing the extrusion body 9 of the kernel element and in between which a card receiving channel 21 is formed. At one end of the extrusion body 9, a cutter 4 is arranged, this cutter providing both a structural reinforcement as a cutting function that is explained below, mainly referring to FIG. 5. The extrusion body is comprised of the two extrusion elements in order to be able to form all channels by means of an extrusion process. Especially, channel 14 of this particular non-limiting embodiment comprises two extrusion elements 2, 3 would have been troublesome to create if the extrusion body would have to be made out of one extrusion element.

Figure 1:
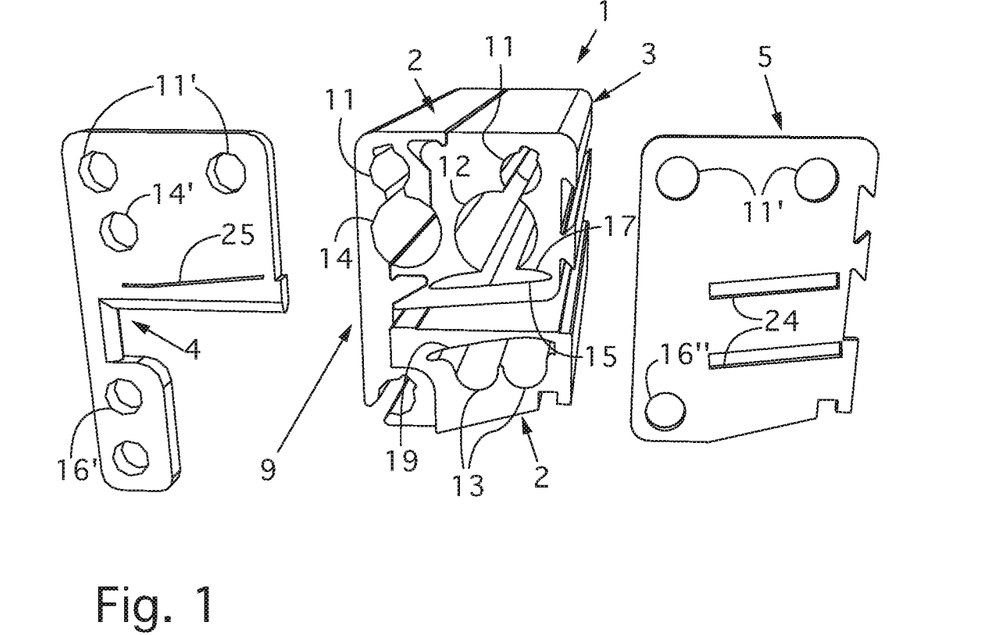
FIG. 1 is a perspective view of part of a first preferred embodiment according to the present invention, showing a cutter, a kernel element, and a strengthening plate.
Figure 2:
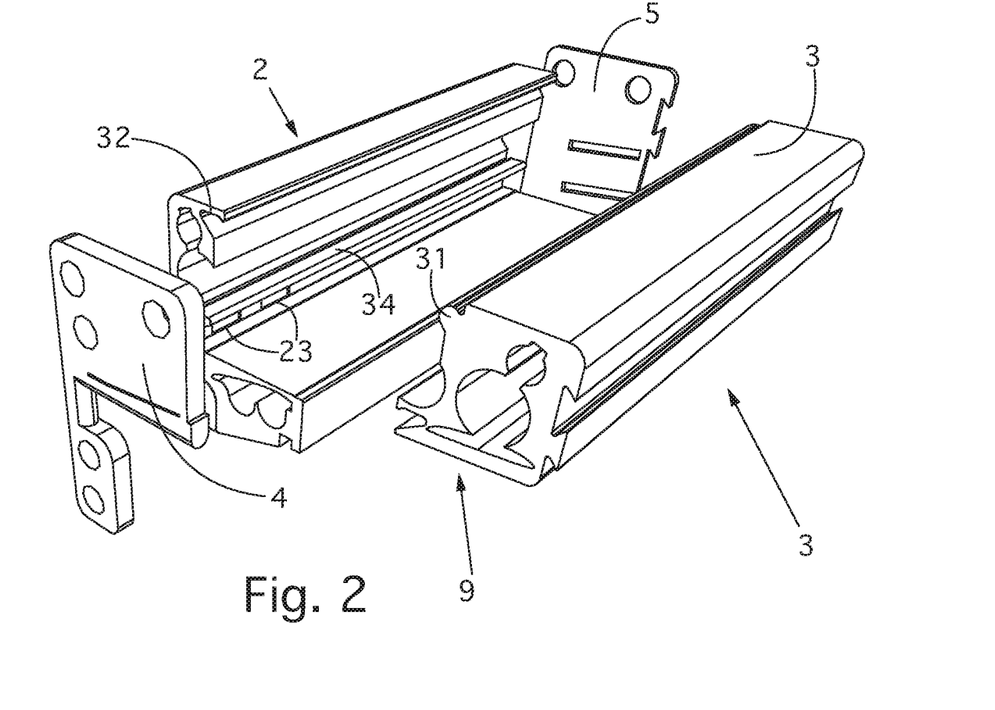
FIG. 2 shows an exploded view of a full kernel element according to FIG. 1.
Figure 3:
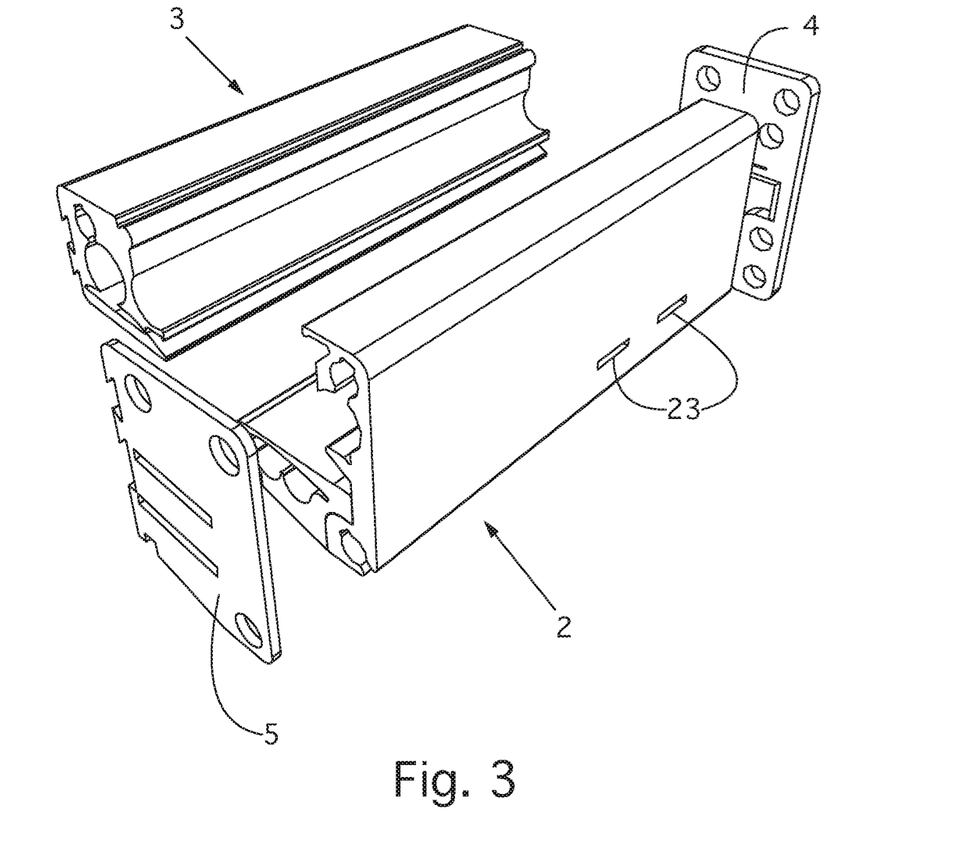
FIG. 3 shows the exploded view of FIG. 2 from a different angle.

The extrusion body 9 comprises several channels providing several functions. Channel 14 is provided for arranging a heater therein. An advantage of such a heater is that the device can be kept frost free, as well as dry. The channel 12 is intended for arranging a ceramic element or bar 61. The ceramic element 61 is intended to assist in preventing cutting through the kernel element. Under the ceramic element 61, a rather flat channel 17 is provided with a bottom wall 15.

The reinforcement plate 5 connects at one end the two extrusion elements, by means of three screws, connecting the holes 11" of the plate with the channels 11 of the extrusion elements as well as the hole 16" with the channel 16 in the extrusion element. In a similar manner, the cutter 4 is connected to the other side of the extrusion elements by means of the hole 16' and the channel 16.

By these connections, the one extrusion body is created out of two extrusion elements. The channels 31 and 32, respectively, 33 and 34 provide a tight fit in order to connect the two extrusion elements.

This channel 17 is intended to hold a flexible substrate, such as a flat cable 24 provided with an electrically conducting track for forming an electrically conducting loop that when cut is indicative for a state of alarm indicating the card reading head is to stop functioning. The flat cable is to provide the alarm indication even when minimally damaged. Therefore, the electrically conducting track is preferably present over the width and length of this letter cable. Preferably longitudinal tracks extend in a zigzag manner lengthwise over the cable with a connecting cross check at one end of the cable. Optionally, it is also possible to have one lengthwise connecting track and zigzag cross tracks. For the purpose of providing a state of alarm, any shape of the tracks is possible provided a conducting loop is formed. The conducting loop is ultimately connected to detecting electronics for detecting breakage of the loop and for providing an indication thereof to the reading head or other electronics of an ATM.

The extrusion body 9 comprises to further channels 13 for holding hard steel elements 62, which hard steel elements are also intended to prevent tampering of the extrusion body, especially the adjacent parts thereof. Because of the presence of the hard steel elements 62, it is effectively prevented to grind or drill in the bottom part of the bank card insertion channel 21. The upper side of the channels 13 forms the underside of a channel 19 with an upper wall 18 also intended to hold the flat cable. This flat cable is adjacent to the steel elements at the underside and will be damaged upon tampering the wall 18, which is of importance as placement of an illegal card reading head in this wall 18 is to be prevented or detected.

The flat cable 6 therefore enters channel 17 through slots 25 of the cutter, extends through the whole length of channel 17 and through slots 24 of plate 5 back into channel 19 all the way back to the front, thereby providing a detection protection over substantially the whole length of the surfaces 15 and 18.

Figure 4:
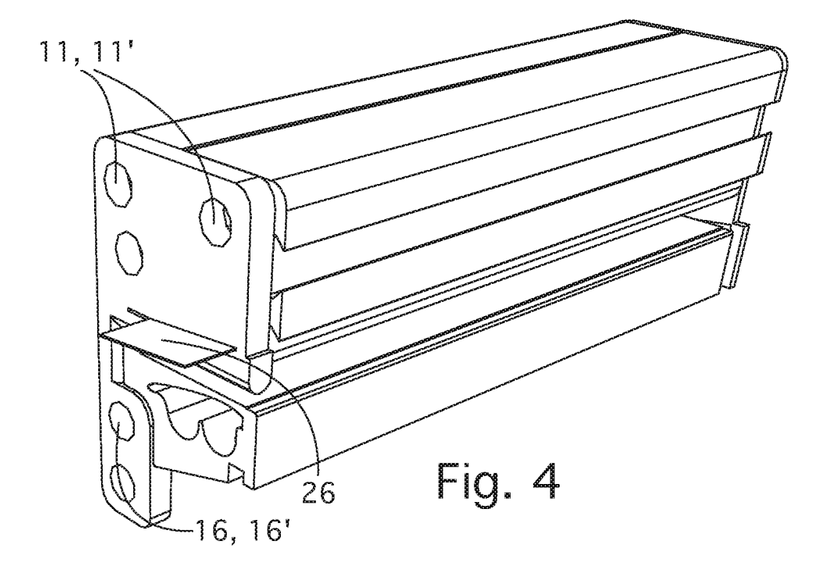
FIG. 4 shows the embodiment in partially assembled form.
Figure 5A:
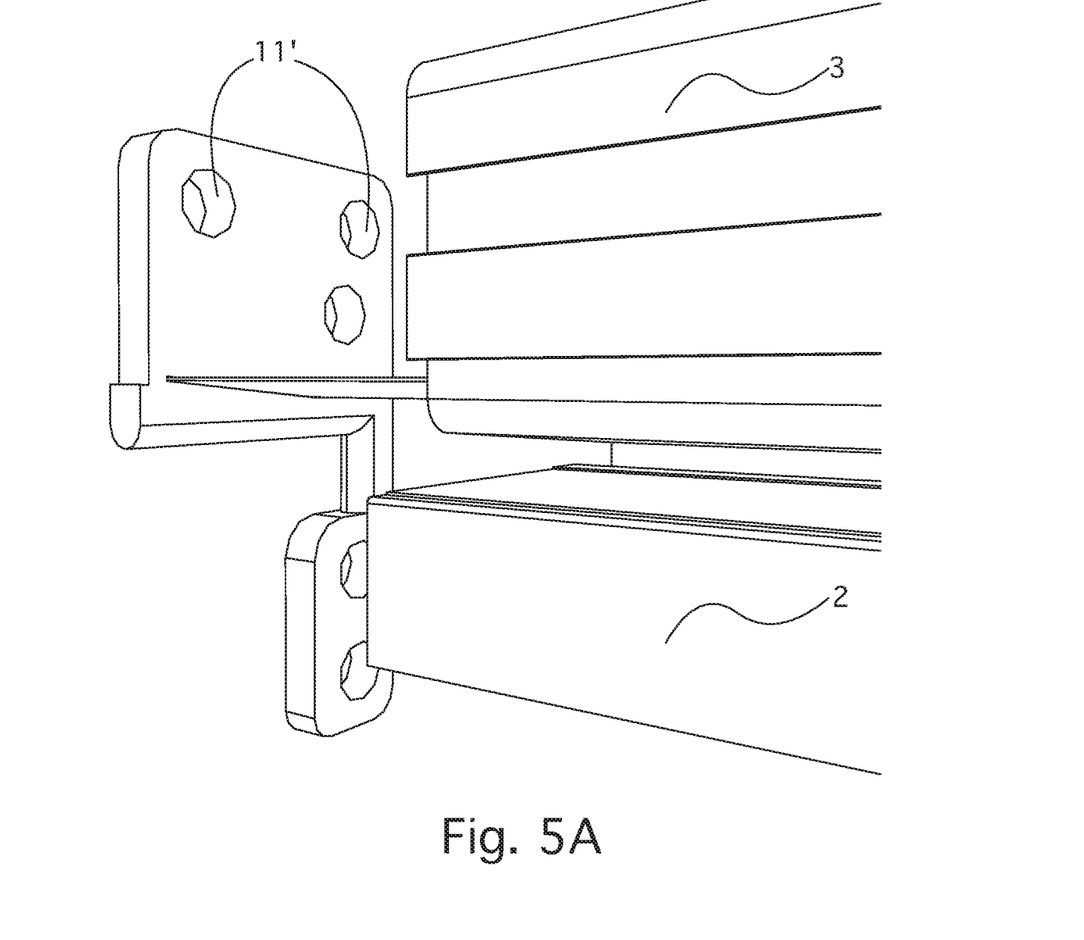
FIGS. 5A and 5B show a partially exploded view, showing the function of the cutter element.
Figure 5B:
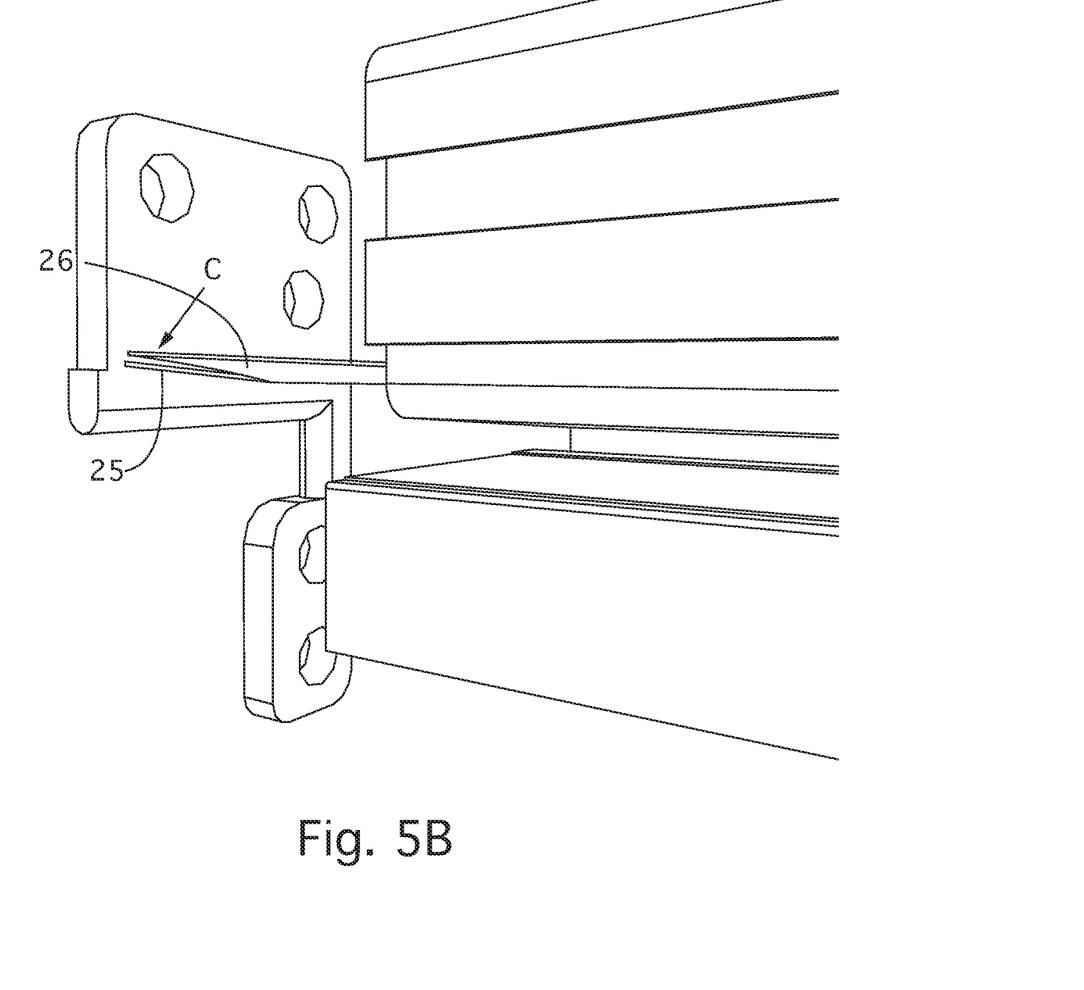

The cutter functions as follows. As can be seen in FIG. 4, the cutter is connected to the extrusion body at one end thereof. In order to be able to function as a cutter, the cutter is rigidly fixed to the underside by means of opening 16'. Although the cutter is also connected by means of the upper openings 11', the connection at the openings 11' is made by means of screws providing a connection that is still movable. This is possible, e.g., by using a sharp screw thread that makes connection but is also breakable. Furthermore, the core of the screws is smaller than the diameter of the channels 11. As the slots 25 in the cutter are a width that is substantially no more than the thickness (such as 0.3 mm) of the flat cable 6, even a slight movement of the cutter relative to wall 15 of channel 17 will cause the cable to be cut or at least one of the electrically conducting tracks to be cut. One purpose of the cutter relative to channel 17 is that it is desirable to detect acts of wrenching or jiggling or tampering in the channel 21. If, e.g., a screwdriver is inserted into channel 21, the wall 15 will be urged upwardly relative to the slot 25, as is schematically indicated in FIG. 5. FIG. 5A shows the flat cable guided through the slot 25, whereas FIG. 5B indicates a relative movement of the flat cable with respect to the slots 25 leading to the side indicated by the C to be cut. Therefore, tampering with the channel 21 will lead to damaging the flat cable and at least one of the tracks that are preferably arranged lengthwise as indicated in the above.

These slots 23 in the back wall of extrusion elements provide a card guiding function to the person using the card unit. This function is described in detail in the cited PCT application to the same applicant.

The lengthwise arrangement of tracks on the flat cable allows for, e.g., 20 tracks on a 12 mm-wide flat cable. For detection, only one of these tracks needs to be cut by the cutter or a drill bit drilled into one of the walls, which drill bit will be forced toward the flat cable because of that ceramic element or the steel elements.

Figure 6:
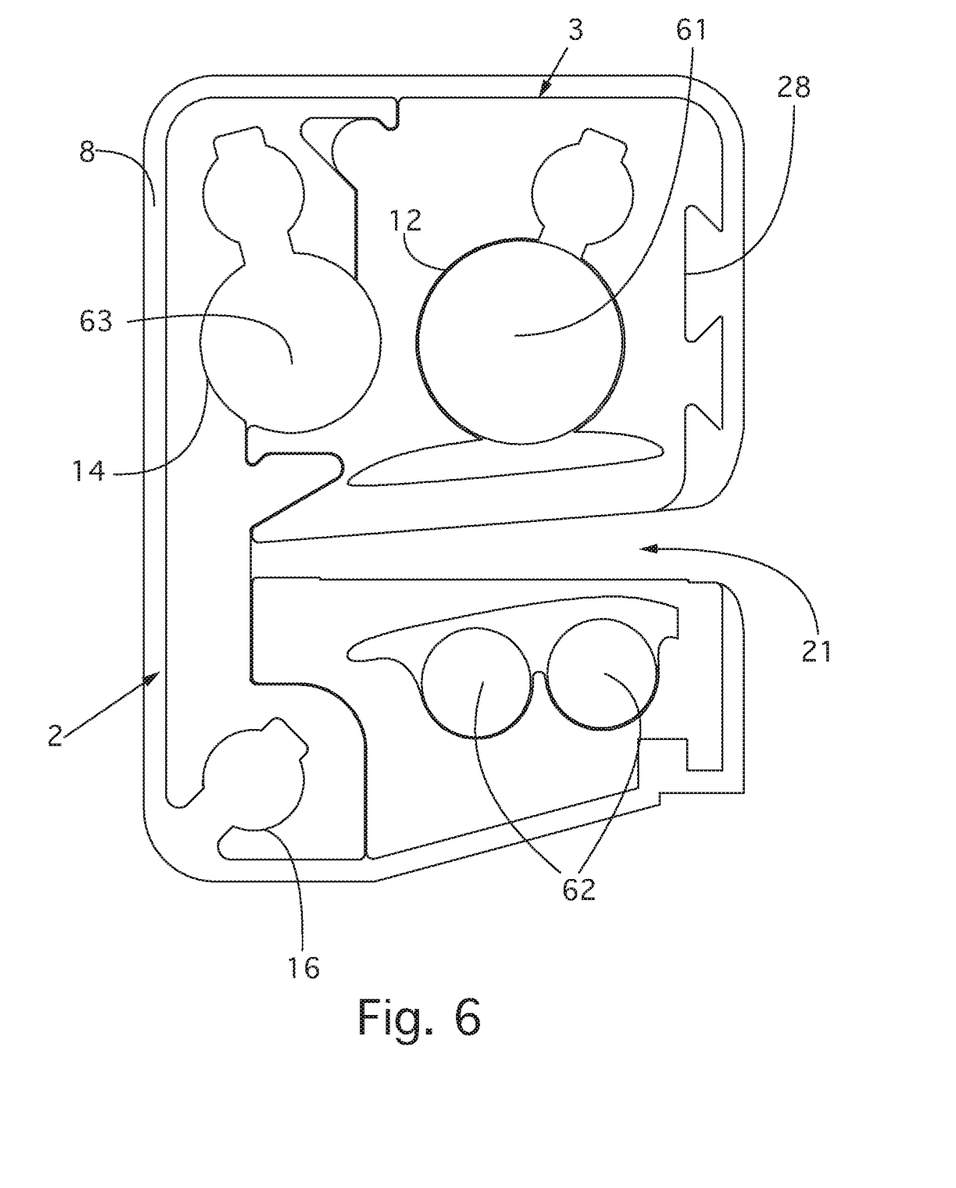
FIG. 6 shows a partially assembled example of a further embodiment.

The cover element is indicated by numeral 8 in FIG. 6, in which it is depicted in cross section. The cover element serves the purpose of providing an exterior to the industrially designed kernel element, which is preferably produced by means of extrusion. A further function preferably provided by the cover element is providing a fixture for the card feed unit to the card reader or the device holding the card reader. To this end, the shape of the cover element is adapted to the shape of the card reader or the device comprising the card feed unit, preferably to the end of providing a fixture in an orientation allowing for the card to be suitably inserted into the card reader. The design shape of the remainder of the cover element is to be determined by being able to cover the kernel element and to provide an appearance suitable to the purpose of use of the card feed unit.

Figure 7:
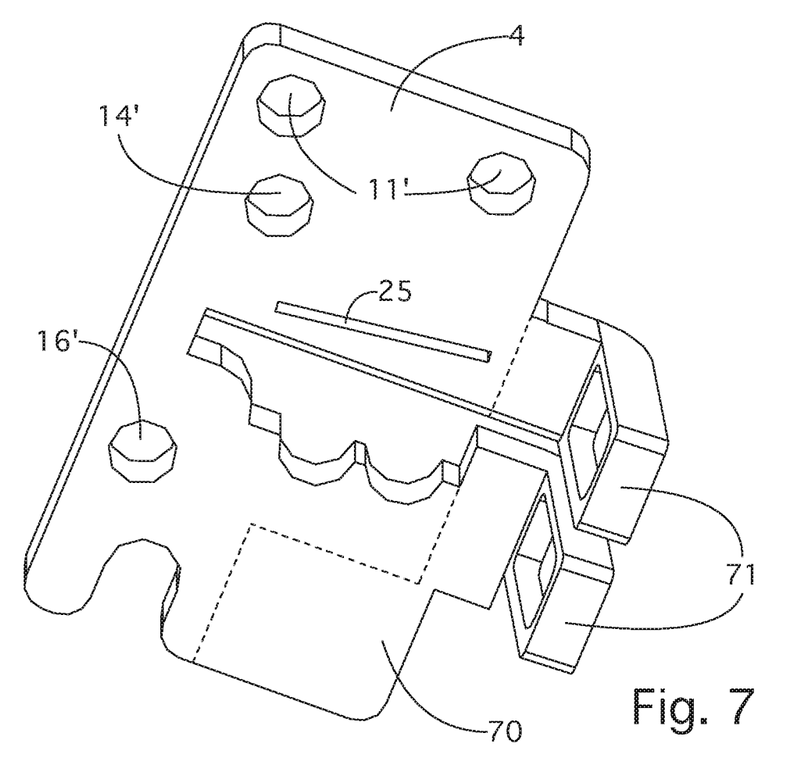
FIG. 7 shows a perspective view of a further embodiment according to the present invention.

FIG. 7 shows an embodiment for protecting an area adjacent to the channel and/or the reading head of the card reader device. The embodiment shown is integrated with the plate 4 of the first embodiment providing for, amongst other features, cutting the electronic alarm providing means. The plate comprises similar fastening means and safety means as in the other embodiment. In the present embodiment, the plate furthermore comprises protrusions or fingers 71. The fingers 71 extend over a space in the card reader behind the front plate of the card reader and before the card reader head. A card has to pass by this space in order to reach and pass the card reader's reading head; therefore, protecting this area allows for preventing skimming by means of a reading head when undesirably placed and located in this area.

The fingers are integratedly formed with the plate or affixed thereto dependently on the material requirements the skilled person desires for a specific use. The fingers may in the situation drawn in FIGS. 7-9 be considered side protection, under the consideration that other protection is envisaged, such as bottom or top protection.

Figure 8:
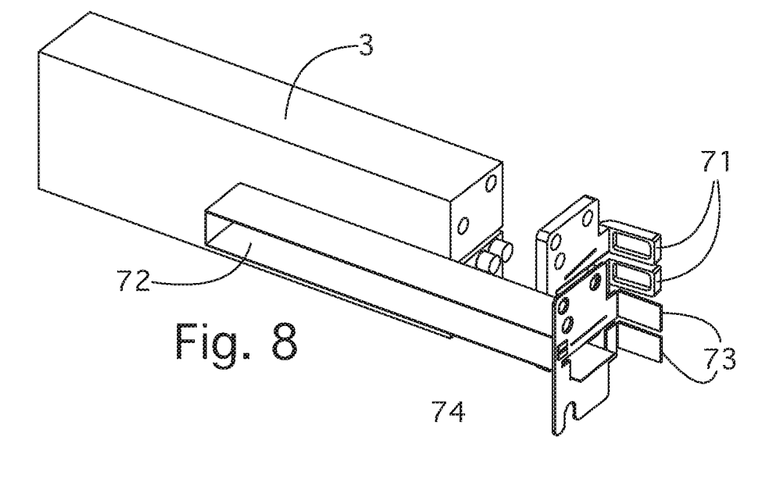
FIG. 8 shows a perspective view of a further embodiment according to the present invention.
Figure 9:
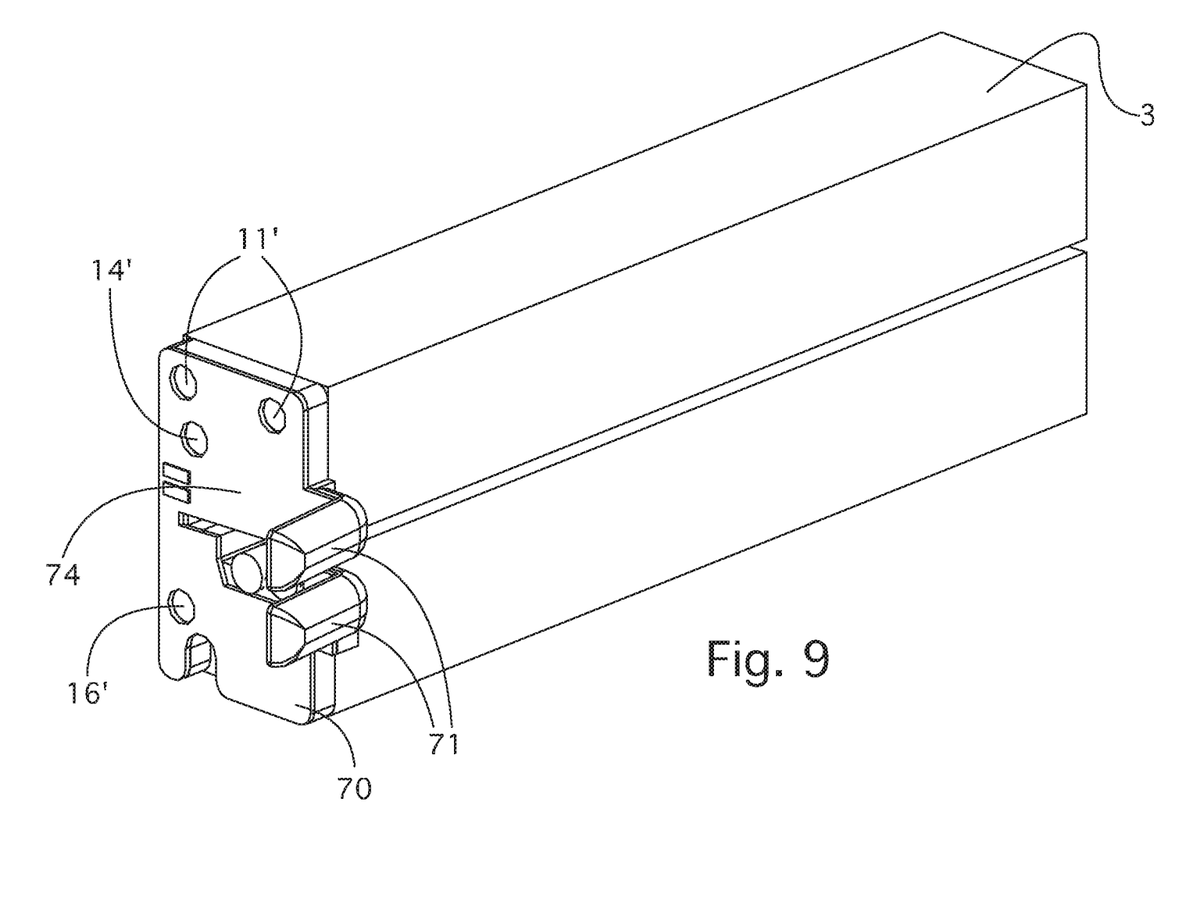
FIG. 9 shows an assembled perspective view of the embodiment according to FIG. 8.

In FIG. 8, a circuit loop substrate 72 similar to part 26 in the above embodiments is mired with conductive pathways that provide detectability of breakage thereof causing an alarm condition. This substrate is ideally formed to be contained in the elongated channels through the arm of the card feed unit as explained in the above. For the part of the substrate 72 to be placed in the fingers 71, a stiffener 73 is provided of a suitable material, which stiffener is helpful for arranging the fingers and for keeping the circuit adjacent to the material, such as metal, of the fingers 71. The part 74 protects the front plate of the card reader. A connection with electric circuitry of the ATM or card reader is provided by contacts 75.

Within the scope of this text, the following definitions apply.

Card information is intended to mean information storable in a data carrier to be read by the card reader, such as for performing card transactions.

A direction substantially perpendicular to the reading direction of the card means that the direction is substantially excluding a direction running parallel to the reading direction of a card. Therefore, the direction substantially perpendicular to the reading direction of the card may have at least two directional components that are not parallel to this reading direction. If the reading direction is generally in the direction of an X-axis, two directional components substantially perpendicular to the reading direction may comprise direction components generally in the direction of a Y-axis, and/or a Z-axis or a combined direction of movement.

The use of magnetic data storage cards has become ubiquitous throughout the world. Examples of such cards include credit cards, debit cards, bank cards, ATM cards, security cards, identity cards, driver licenses, etc. Such a card has standardized shape and dimensions, and it stores the data in parallel tracks within a magnetic strip. The location and/orientation of the strip on the card are also standardized. In operational use, the data stored in the magnetic strip of the card is read by swiping or otherwise transporting the card past a reading head of a card reader in the user interface of a computerized secure system. The user interface typically has a card slot that is dimensioned in order to have the card inserted in such an orientation that the magnetic strip is transported past the reading head by the user's inserting the card. The system processes the data thus read together with a personal identification number (PIN) or other password, entered by the card's owner into the system via a keyboard and/or touch screen in the system's user interface.

The term "skimming" refers to the theft of secure information stored in the magnetic strip of a credit card, a debit card, a bank card, an ATM card, a security card, an identity card, etc., while the card is being used in a normal legitimate transaction. In a practical scenario, a thief places a small electronic device, referred to as a "skimmer", at or over the card feed slot of an ATM. For example, a skimmer is accommodated in a false front overlying the card slot of a dip card reader or of a motorized reader.

As another example, a skimmer is positioned within or at one or both extremities of the channel of a swipe card reader, e.g., by means of using a false front cover accommodating the skimmer's reading head. The channel is wider at the extremity than at the position of the reading head so as to facilitate feeding the card into the channel being swiped. The skimmer reads the magnetic strip as the user unknowingly passes his/her card through it. These skimming devices are often used in conjunction with a pinhole camera to read the user's PIN at the same time. The skimming device stores the data read or instantly transmits the data via a wireless connection to the thief. The information thus stolen can then be used by the thief to assume the card owner's identity, for example, for obtaining goods without paying, withdrawing money from the card owner's bank account, obtaining access to gated premises, etc.

As an additional embodiment (FIG. 10), the earlier indicated fingers may be integrated into a body 103 of a unit 100 to be placed over the card insertion front part of a card transaction machine such as an ATM. The body 103 covers the inner surface of a recess or open space into which the fingers of the card feeding unit are brought to grip the card for extraction thereof of an existing manual card reader. The elements 73 of FIG. 10, which have a similar function as the fingers of the FIG. 8 embodiment, are integrated into the body of FIG. 10. These elements are positioned over and under the side of the recess or open space into which the fingers of the card feeding unit are brought to grip the card, and because of this position, the elements protect the transaction machine from attempts to create an opening from that recess to therethrough position a skimming head just in between the official magnetic strip reading head and the front side of the card feed slot, at which position a skimming reading head would be able to cover the whole magnetic strip while being inserted or taken out of the slot. The device shown is a card feed unit with incorporated kernel elements enclosed in the cover member 8.

Figure 10:
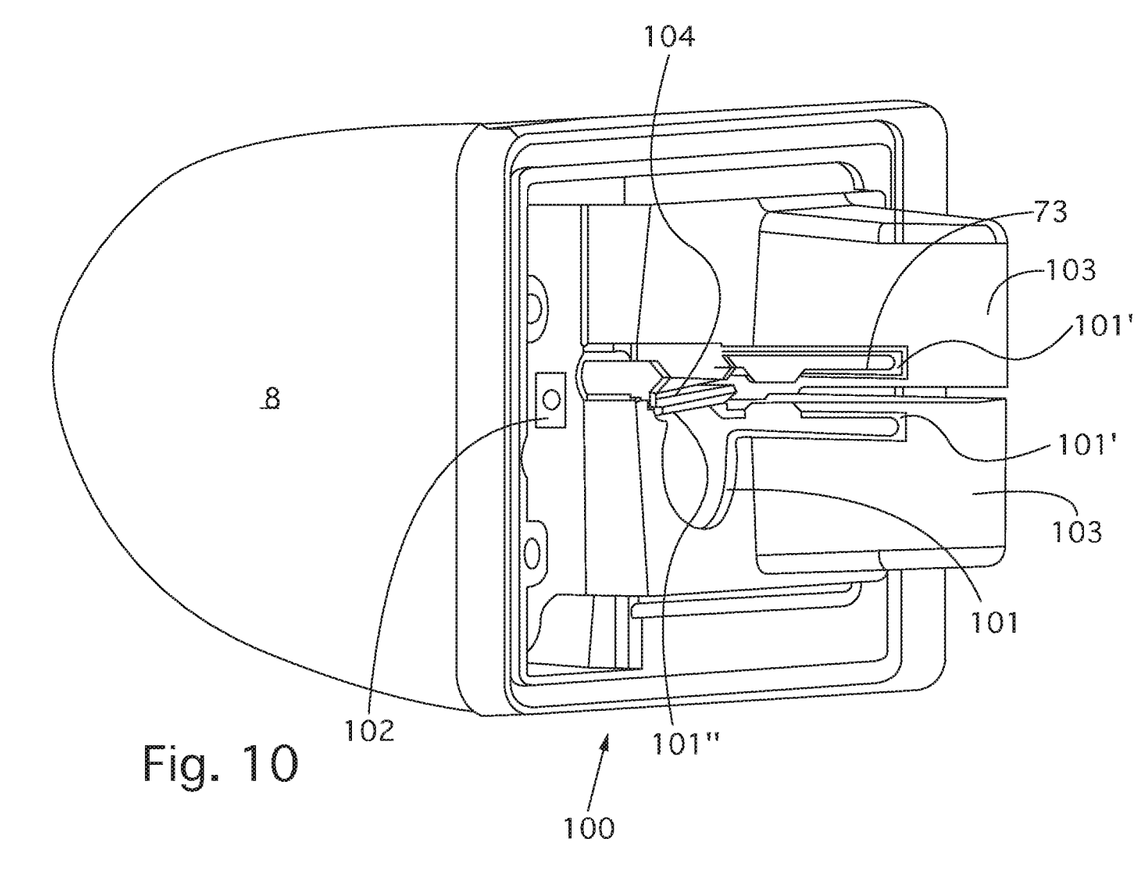
FIG. 10 shows a rear perspective view of a further embodiment according to the present invention.

This card feed unit also incorporates an electrical detection loop, comprising a loop part 101 extending around a round opening for holding a protective bulge of the card reader, a loop part 101' extending through the fingers, and a loop part 101" extending along the card feed slot 104, especially the part of the card feed slot located at the position at which the magnetic strip of the card passes during use.

A loop interrupting tamper switch 102 is arranged to interrupt the loop when the unit 100 is removed from the device, such as more than 0.1, 0.5, 0.7, or 0.9 mm from the transaction machine, e.g., ATM. The tamper switch is arranged in a recess in the unit 100 to be at a distance from the surface of the front of the transaction machine. An advantage thereof is that tampering of the switch 102 is not possible when the unit is arranged on the transaction machine. A distance provider, such a screw or bolt, extends toward the switch in the recess with a corresponding distance span to arrange for the switch to be closed in the operational mounting position of the unit 100.

An advantage of such a device is that the body 103 is protective of the fingers and the loop part 101' extending through the fingers.

An important advantage of this embodiment is that it is adapted by shape to fit an existing card reader with existing external features, and that within the scope of the present disclosure, it is adaptable by shape to fit over existing card readers with existing external features. Existing is to be interpreted as to a card reader's features, where the card reader is already developed or will be developed in the future.

Figure 11A:
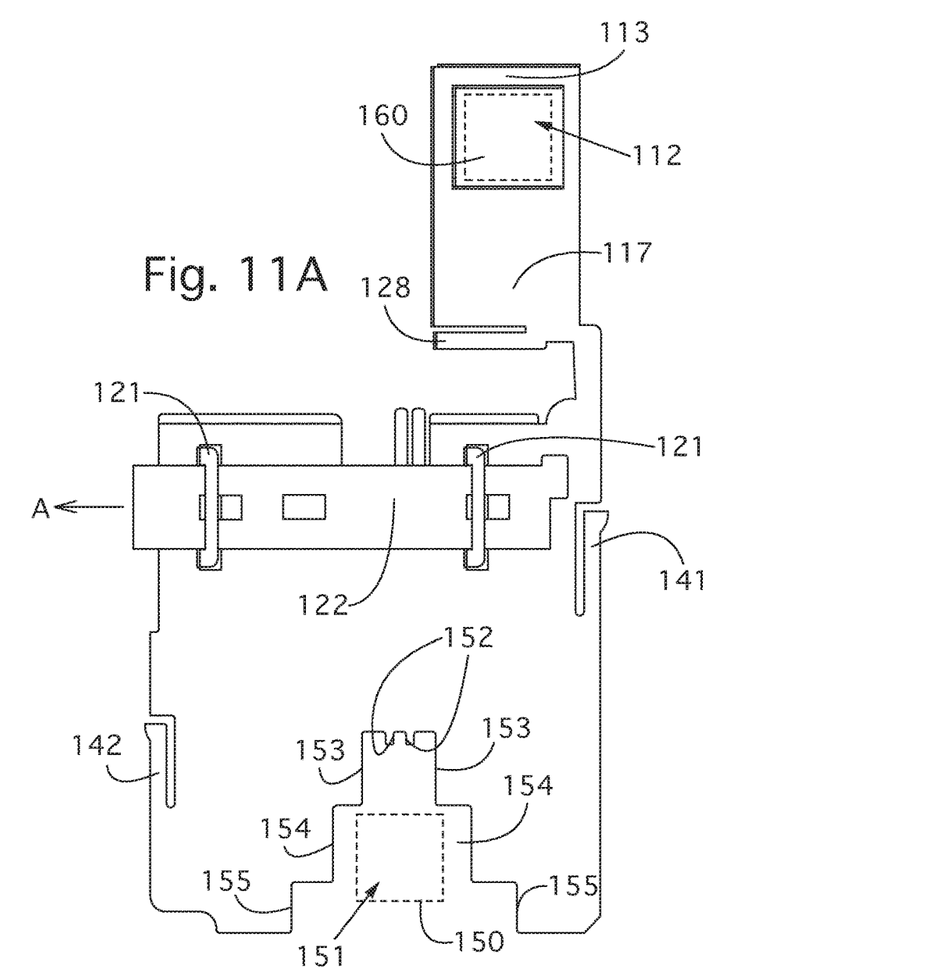
FIGS. 11A and 11B show respective views of a further embodiment according to the present invention.
Figure 11B:
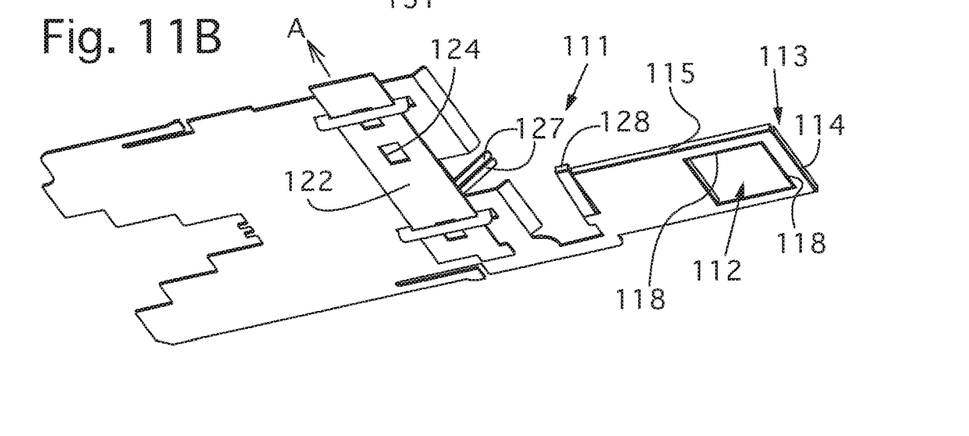

A further embodiment of the present invention is related to an internal protection member 111 (FIGS. 11A-11B) to be placed inside a card reader. An important advantage of the internal protection member 111 is that it may be placed on the inside of an existing card reader, without opening the card reader or even accessing secure parts thereof. One reason for this is that the internal protection member may be inserted into the card reader, when the card reader remains closed through the card insertion slot, or it may be oriented on the inside during assembly or production of a card reader. The objective of this embodiment is to protect weak spots of the internal space of card readers.

For reading out the magnetic strip of a transaction card, such readers possess a magnetic strip reading head 160 at the front side thereof. In terms of FIG. 11, the reading head would be located within the opening 112 when the device 111 is inserted into the card reader. A skimmer would try to place a skimming reading head at the location of the bridging part 113 of the card reader. It is the main objective of the present embodiment in light of such undesired positioning of a skimming reading head to block this space between the official reading head and a front plate (not shown) of the card reader.

This is made possible as the device 111 is blocking this space and is produced from preferably a difficult-to-destroy metal. Preferably, a blade spring metal is used. The bridging part 113 is preferably reinforced by ridges 114 and 118 than from the same plate material. A further reinforcing rib 115 is used to reinforce plates part 117.

Preferably, a patch of adhesive material 116 is used for fastening the device to an internal part to be determined of the card reader. Depending on the card reader in which the device 111 is used, adhesive patches may be applied elsewhere.

Blocking members 127, 128, preferably with biasing properties, such as biasing properties imparted by the metal of which the device is made, are designed depending on internal parts of the card reader to be used. The same number, less or more, may be applied in each instance. The optional blocking members may fulfill the purpose of keeping the device safely in the card reader, the purpose of guiding the device into the card reader.

An optional movable blocking member 122, such as a latch, is used for locking the device into the card reader in a non-returnable way. After inserting the device into the card reader through the slot of the cards, the device is optionally pressed down and glued, and thereafter, the latch may be moved sideways to prevent removal of the device. Unlatching may be prevented by one-way blocking members 124, such as pushed-out plate material, that may slide in one direction through the latch guides 121 in the direction of the arrow A. The location of such a latch may be dependent on the location of suitable gripping parts on the inside of the card reader.

Positioning members 141,142 with a biasing property for biasing point-shaped ends thereof outwardly are provided for precisely positioning the device 111 into place in the space inside the card reader, partially also by defining the side-to-side positioning of the device. Preferably, the device is marginally narrower that the width of the card to be inserted into the card reader with the said points slightly extending beyond the size of a card both for allowing the device in any regular card reader and for providing a positioning and fixing capacity to the device by the positioning members. Member 142 preferably has a higher biasing force to force the device toward the side of member 141 or member 141 has no biasing force, and member 141 preferably enters a recess of the inside of the card reader for blocking the device relative to the recess inside of the card reader.

The other longitudinal end with the stepped opening or recess 151 formed by the stepped wall parts 153, 154, 155 from narrow to wide is provided for encompassing the chip reader from the card reader equipped with at least a chip reader or also the magnetic strip reader. The protrusions 152 provide support for the device 111 during placement and during regular use in an example of a card reader.

This part of the device provides for an anti-shimming function as, when the device is provided in front of the chip reader, functionally placing a shimming device to shim the data from the chip is hampered by the presence of the device. A shimming device intends to provide for a thin component to be placed between the reading head 150 contacts and the contacts of the card chip, letting both the signals of the chip through to the reader and back and providing means to also lead those signals to electronics sending shimming control signals to the chip.

As the device is located adjacent to the chip reading head, the shimming device has no space left to allow for co-locating both, thereby effectively blocking the chip shimming option. The thoughput opening of the card reader is normally quite spacious for allowing a card to pass through without any hindrance. The device 111 limits the card entry opening in order to prevent shimming or skimming devices to be put through the card opening as, e.g., a form of inlay.

The shape of the device at any part thereof may be adapted to specific card reader interiors in light of the defined functions.

Anti-skimming or anti-shimming devices for placement inside of a card reader for providing protection adjacent to either a magnetic strip reading head or a chip reading head by providing a sheet of protective material, such as a metal material or a preferably reinforced plastic material, such as fiber, preferably glass fiber reinforced, the device being fittable or retrofittable through the card slot of the card reader, and preferably providing any means, are individually defined and individually described in the above description and annexed drawings.

A further example definition of shimming is worded as follows: shimming works by compromising a perfectly legitimate card reader (like a Pin Pad) by inserting a very thin, flexible circuit board through the card slot that will stick to the internal contacts that read card data. The shim is inserted using a "carrier card" that holds the shim, inserts it into the card slot, and locks it into place on the internal reader contacts. The carrier card is then removed. Once inserted, the shim is not visible from the outside of the machine. The shim then performs a so-called man-in-the-middle attack between an inserted credit card and the circuit board of the Pin Pad machine. See the image below for an example of what a skim looks like inside the Pin Pad. The term "skimming" is sometimes also used for what has been indicated as shimming in the above, e.g., for obtaining data from the chip in addition to obtaining information from the magnetic strip.

In the above, the present invention is described with reference to one or more preferred embodiments. Several aspects of several distinct preferred embodiments are described in the above. Furthermore, the features of distinct embodiments are deemed to be described in combination with each other in order to provide a description of all combinations that are considerable within the scope of this description by an expert in the field. The above disclosures of these preferred embodiments are not limiting to the scope of protection of this document. The rights sought are determined in the annexed claims.

The invention claimed is:

1. An anti-skimming or anti-shimming device for placement inside of a card reader for providing protection adjacent to either a magnetic strip reading head or a chip reading head, the device comprising:
a sheet of protective material, the sheet of protective material being configured to block space between an official reading head and a front plate of the card reader, wherein the sheet is fittable or retrofittable in a card channel of the card reader.

2. The anti-skimming or anti-shimming device according to claim 1, wherein the sheet of protective material comprises a metal material.

3. The anti-skimming or anti-shimming device according to claim 1, wherein the sheet of protective material comprises a plastic material.

4. The anti-skimming or anti-shimming device according to claim 1, wherein the sheet of protective material comprises a reinforcement.

5. The anti-skimming or anti-shimming device according to claim 4, wherein the reinforcement comprises fibers.

6. The anti-skimming or anti-shimming device according to claim 5, wherein the fibers are glass fibers.

7. The anti-skimming or anti-shimming device according to claim 1, wherein the sheet of protective material is placeable on an inside of an existing card reader.

8. The anti-skimming or anti-shimming device according to claim 7, wherein the sheet of protective material is placeable on the inside of the existing card reader without opening the existing card reader or accessing secure parts thereof.

9. The anti-skimming or anti-shimming device according to claim 1, further comprising a patch of adhesive material for fastening the device to a predetermined internal part of the card reader.

10. The anti-skimming or anti-shimming device according to claim 1, further comprising a blocking member for keeping the device safely in the card reader.

11. The anti-skimming or anti-shimming device according to claim 10, wherein the blocking member comprises a biasing property.

12. The anti-skimming or anti-shimming device according to 11, wherein the biasing property is imparted by a metal material of which the device is made.

13. The anti-skimming or anti-shimming device according to claim 10, wherein the blocking member is designed depending on internal parts of the card reader to be used.

14. The anti-skimming or anti-shimming device according to claim 1, further comprising one-way blocking members configured to prevent unlatching.

15. The anti-skimming or anti-shimming device according to claim 14, wherein the one-way blocking members comprise latches.

16. The anti-skimming or anti-shimming device according to claim 1, wherein the device has a size marginally narrower than a width of a card to be inserted into the card reader.

17. The anti-skimming or anti-shimming device according to claim 16, wherein the device comprises positioning members slightly extending beyond a size of the card.

18. A transaction machine for performing all transactions while using a payment card, the transaction machine comprising:
- a readout unit for reading out of card information from a data carrier of a payment card; and
- an anti-skimming or anti-shimming device according to claim 1.

19. A method for safely performing transactions on a transaction machine for performing all transactions while using a payment card, comprising:
- providing a transaction machine comprising an anti-skimming or anti-shimming device according to claim 1, wherein the anti-skimming or anti-shimming device is placed in a card reader of the transaction machine such that the sheet of protective material blocks a space between an official reading head and a front plate of the card reader; and
- allowing a user to use the transaction machine for performing a transaction.

* * * * *